(12) United States Patent
Birchenko (10) Patent No.: US 11,082,840 B2
(45) Date of Patent: Aug. 3, 2021

(54) SYSTEM AND METHODS FOR FAST, SECURE AND POWER EFFICIENT OCCUPANCY SESSION MANAGEMENT

(71) Applicant: Nwave Technologies, Inc., Los Gatos, CA (US)

(72) Inventor: Yury Birchenko, Twickenham (GB)

(73) Assignee: Nwave Technologies, Inc., Redding, CA (US)

( * ) Notice: Subject to any disclaimer, the term of this patent is extended or adjusted under 35 U.S.C. 154(b) by 0 days.

(21) Appl. No.: 16/539,879

(22) Filed: Aug. 13, 2019

(65) Prior Publication Data

US 2020/0053563 A1 Feb. 13, 2020

Related U.S. Application Data

(60) Provisional application No. 62/718,301, filed on Aug. 13, 2018.

(51) Int. Cl.
| | |
|---|---|
| *H04W 12/06* | (2021.01) |
| *H04L 9/08* | (2006.01) |
| *H04L 9/32* | (2006.01) |
| *H04L 29/06* | (2006.01) |
| *H04W 4/80* | (2018.01) |
| *H04W 8/00* | (2009.01) |

(Continued)

(52) U.S. Cl.
CPC ........ *H04W 12/06* (2013.01); *G06K 7/10366* (2013.01); *H04L 9/0833* (2013.01); *H04L 9/321* (2013.01); *H04L 63/1458* (2013.01); *H04W 4/80* (2018.02); *H04W 8/005* (2013.01); *H04W 12/03* (2021.01); *H04W 12/122* (2021.01); *H04L 2209/805* (2013.01); *H04L 2209/84* (2013.01); *H04L 2463/141* (2013.01); *H04W 52/0254* (2013.01)

(58) Field of Classification Search
CPC ... H04W 12/06; H04W 4/80; H04W 12/1204; H04W 12/001; H04W 8/005; G06K 7/1036; H04L 9/0833; H04L 9/321; H04L 63/1458
See application file for complete search history.

(56) References Cited

U.S. PATENT DOCUMENTS

| | | | | |
|---|---|---|---|---|
| 2011/0066856 | A1* | 3/2011 | Yao | .......... H04L 9/003 713/170 |
| 2015/0356498 | A1* | 12/2015 | Casanova | .............. G07B 15/02 705/13 |

(Continued)

*Primary Examiner* — Nabil H Syed (57) ABSTRACT

An automated vehicle parking system uses a driver's authentication device, such as a mobile phone or portable tag, to identify the driver. Vehicle sensing terminals detect when and where a vehicle has parked and send wireless notifications to the vehicle owner's authentication device. The authentication device, the vehicle sensing terminal and a cloud server interact using secure wireless communications to validate the driver's qualifications and record the parking event. Vehicle sensing terminals detect when the vehicle leaves its parking space and the parking system automatically terminates the parking session. The authentication device handles the bulk of the communication with the cloud server to reduce consumption of the vehicle sensing terminal's power supply. The sensing and portable tag devices communicate using secure tokens that are encrypted with unique individual or group keys.

24 Claims, 8 Drawing Sheets

(51) Int. Cl.
*G06K 7/10* (2006.01)
*H04W 12/03* (2021.01)
*H04W 12/122* (2021.01)
*H04W 52/02* (2009.01)

(56) References Cited

U.S. PATENT DOCUMENTS

| | | | |
|---|---|---|---|
| 2016/0127875 A1* | 5/2016 | Zampini, II | G01S 5/0226 |
| | | | 370/311 |
| 2017/0237945 A1* | 8/2017 | Murar | H04N 7/183 |
| | | | 348/148 |
| 2018/0061145 A1* | 3/2018 | Blustein | G07C 9/00571 |
| 2020/0150213 A1* | 5/2020 | Oh | G01S 1/024 |

* cited by examiner

SYSTEM AND METHODS FOR FAST, SECURE AND POWER EFFICIENT OCCUPANCY SESSION MANAGEMENT

CROSS-REFERENCE TO RELATED APPLICATIONS

The present application claims priority to provisional application Ser. No. 62/718,301, filed on Aug. 13, 2018, entitled "SYSTEM AND METHODS FOR FAST, SECURE AND POWER EFFICIENT OCCUPANCY SESSION MANAGEMENT" naming the same inventors as in the present application. The contents of the above referenced provisional application are hereby incorporated by reference, the same as if fully set forth herein.

FIELD

Embodiments of the present invention generally relate to the field of vehicle parking management. More specifically, embodiments of the present invention relate to occupancy session management using wireless vehicle sensors.

BACKGROUND

Traditional parking systems have many inefficiencies. Drivers face many problems including finding a free parking space, finding exact change accepted by parking meters, paying a fine and recovering a towed-away vehicle when they under-pay, over-paying to avoid getting a fine, and having to get a parking stub from a machine. Institutions responsible for parking want to ensure that drivers correctly pay and avoid unauthorized parking while at the same keeping overall parking management costs low.

A new generation of automated parking systems, called smart parking systems, that use advanced technological solutions are being developed to help solve the problems of the traditional parking systems. A wireless vehicle sensor monitors the presence of a motor vehicle within a parking space. The wireless vehicle sensor communicates with the smart parking management system using a wireless protocol. The smart parking management system keeps track of which parking spaces are used and communicates real time information about parking use and spot availability to drivers, parking operators and other interested parties. The wireless vehicle sensor typically receives its power from a non-commodity, long-life battery.

Smart parking systems need a secure, reliable, fast, low-cost method of detecting and identifying vehicles for individual parking spaces. Additionally, since the sensors used by many parking management systems are battery operated, or otherwise have limited power reserves, it would be advantageous to operate the sensors in such way to extend their power life.

SUMMARY OF THE INVENTION

Embodiments of the present invention provide an automated vehicle parking system that can use a driver's authentication device, such as a mobile phone, vehicle embedded computer or portable tag, to automatically identify the driver. Vehicle sensors detect when and where a vehicle has parked and send wireless notifications to the driver's authentication device. The authentication device, the vehicle sensor and a cloud server interact using secure wireless communications to validate the driver's parking authorization and record the parking event. The validation is then communicated back from the cloud server, also known as a remote validation server. Vehicle sensors detect when the vehicle leaves its marked or unmarked parking space and the parking system automatically terminates the parking session. In certain embodiments, the authentication device handles the bulk of the communication with the cloud server to reduce consumption of the vehicle sensor's power supply. The devices communicate using secure tokens that are encrypted with unique individual keys. Within various embodiments, the driver's authentication device, also known as a mobile electronic device, could be a smart phone, a mobile computing device attached to the vehicle or a fob, e.g., a keychain fob.

According to one embodiment, a method of automatically detecting and validating a vehicle is disclosed. The method includes detecting a vehicle using a sensing device in proximity to the vehicle, broadcasting a first message from the sensing device responsive to the detecting where the broadcasting is performed by wireless communication and where the first message or part of that first message is encrypted and the first message includes a sensing device identifier and is received by a mobile computing device associated with the vehicle, sending a second message from the mobile computing device to a remote validation server responsive to receiving the first message, where the second message includes an identifier of the mobile computing device and all or part of the first message, validating the second message at the remote validation server based on the sensing device identifier, and a database of the remote validation server, and sending a third message from the remote validation server to the mobile computing device indicating a result of the validating.

According to some embodiments, the method includes sending a fourth message indicating the result of the validating from the mobile computing device to the sensing device, and updating a status of the sensing device responsive to the sensing device receiving the message indicating the result of the validating, where the status of the sensing device is updated to indicate that a parking space associated with the sensing device is occupied by a validated visitor.

According to some embodiments, the detecting including detecting the vehicle using a plurality of sensing devices in proximity to the vehicle, the broadcasting includes broadcasting a plurality of first messages from the plurality of sensing devices where the plurality of first messages include a plurality of sensing device identifiers associated with the plurality of sensing devices, the second message includes the plurality of first messages, the validating includes validating the plurality of sensing devices using the plurality of sensing device identifiers and the database, and the third message includes a listing of validated sensing devices determined from the validating.

According to some embodiments, the method includes selecting a sensing device from the listing of validated sensing devices, where the selecting is performed by one of: a user input, using additional data, including at least one of wireless signal strengths of the plurality of first messages, times of vehicle detection on each sensing device, the status of each sensing device, and sensor measurements on each sensing device, sending or acknowledging an identification of the selected sensing device from the mobile computing device to the remote validation server, and updating a status of the selected sensing device, by the remote validation server, to indicate that a parking space associated with the selected sensing device is occupied by a validated visitor.

According to some embodiments, validating the second message includes decrypting the encrypted part of the first message included in second message to determine the originating sensing device identifier, determining a mobile computing device identifier from the second message, and authenticating the sensing device identifier against the mobile computing device identifier using information in the database.

According to some embodiments the database includes individual and/or group encryption keys for the sensing device.

According to some embodiments where the broadcasting a first message is performed using Bluetooth Low Energy (BLE), Bluetooth 5 or successor protocols.

According to some embodiments the first message includes a time varying data field.

According to some embodiments one or more of the messages include respective checksum data.

According to some embodiments the broadcasting includes transmitting first messages multiple times per 10 second interval regardless of the occupancy status of the sensing device and where each first message includes a respective time varying data field.

According to some embodiments, the method includes detecting a vehicle using a sensing device in proximity to the vehicle, responsive to the detecting, broadcasting a first message from the sensing device using wireless communication, where the first message is encrypted and includes a sensing device identifier associated with the sensing device, receiving the first message at an electronic visitor tag, generating a second message from the electronic visitor tag where the second message is encrypted and includes an identifier of the electronic visitor tag, sending the second message from the electronic visitor tag to the sensing device, sending a third message from the sensing device to a remote validation server where the third message is encrypted and includes all or part of the second message, and validating the third message by the remote validation server.

According to some embodiments where the remote validation server transmits a fourth message indicating a result of the validating to the sensing device, and updating a status of the sensing device based on the result of the validating.

According to some embodiments the detecting a vehicle includes detecting the vehicle using a plurality of sensing devices in proximity to the vehicle, the broadcasting a first message includes broadcasting a plurality of first messages from the plurality of sensing devices responsive to the detecting, and where the plurality of first messages includes a plurality of a sensing device identifiers associated with the plurality of sensing devices, and the receiving the first message at an electronic visitor tag includes receiving the plurality of first messages at the electronic visitor tag. The method further includes selecting a sensing device from the plurality of sensing devices at the electronic visitor tag. The sending the second message from the electronic visitor tag to the sensing device includes sending the second message from the electronic visitor tag to the selected sensing device. The method also includes sending a third message from the selected sensing device to a remote validation server where the third message is encrypted and includes all or part of the second message.

According to some embodiments selecting the sensing device from the plurality of sensing devices includes determining a closest available sensing device in proximity to the electronic visitor tag from the plurality of sensing devices.

According to some embodiments the sensing device detects when a vehicle has left a parking space and sends a message from the sensing device responsive to the detecting where the message is performed by wireless communication, and where the message or part of that message is encrypted and the message includes a sensing device identifier and is received by the remote server.

According to another embodiment, a system for validating a vehicle for parking is disclosed. The system includes a sensing device including a sensing device identifier and operable to detect a vehicle in close proximity thereto and further operable to communicate a first encrypted message wirelessly responsive to detecting the vehicle, an application program operable to execute on a mobile electronic device including an identifier, where the application program is operable to receive the first message and to generate a second message including the identifier of the mobile electronic device, and all or part of the first message, and a remote server including a database, where the remote server is operable to receive the second message and to validate the identifier of the mobile electronic device and the sensing device identifier and is further operable to communicate a third message indicating a validation result thereof, where the remote server is further operable to record a parking state associated with the vehicle.

According to some embodiments the database includes an encryption key for the sensing device and where the remote server is further operable to decrypt the encrypted second message using the encryption keys and where further the encrypted first message includes a time varying data field.

According to some embodiments the mobile electronic device is either a smart phone or a vehicle's embedded computer, where the first message is sent to the application program on the smart phone or vehicle's embedded computer, where the application program is operable to cause to be sent the second message to the remote server, where the application program on the smart phone or vehicle's embedded computer is operable to receive the third message, and where the application program on the smart phone or vehicle's embedded computer is operable to cause to be sent an acknowledgement message to the sensing device indicating the validation result.

According to some embodiments the system includes a plurality of sensing devices each including a respective sensing device identifier and operable to detect a vehicle in close proximity thereto, the plurality of sensing devices are further operable to wirelessly communicate a plurality of a first messages responsive to detecting the vehicle, and where the mobile electronic device is a smart phone or vehicle's embedded computer, where the encrypted second message includes the plurality of first messages, where the remote validation server is operable to validate the plurality of sensing devices and where the third message includes a list of validated sensing devices of the plurality of sensing devices, where the application program on the smart phone or vehicle's embedded computer is further operable to select a selected sensing device from the list of validated sensing devices using one of a user input, using additional data, including at least one of wireless signal strengths of the plurality of first messages, times of vehicle detection on each sensing device, the status of each sensing device, and sensor measurements on each sensing device, and where further the application program on the smart phone or vehicle's embedded computer is further operable to cause to be communicated an identity of the selected sensing device to the remote server.

According to some embodiments the mobile electronic device is a fob, where the fob utilizes a motion activated power savings mode and is operable to communicate the second message to the sensing device, where the second message is encrypted, where the sensing device is operable to relay the encrypted second message to the remote server, where the remote server is operable to communicate the third message indicating the validation result to the sensing device, and where the sensing device is operable to communicate the validation result to the fob.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to various embodiments in accordance with the present disclosure, examples of which are illustrated in the accompanying drawings. While described in conjunction with various embodiments, it will be understood that these various embodiments are not intended to limit the present disclosure. On the contrary, the present disclosure is intended to cover alternatives, modifications and equivalents, which may be included within the scope of the present disclosure as construed according to the Claims. Furthermore, in the following detailed description of various embodiments in accordance with the present disclosure, numerous specific details are set forth in order to provide a thorough understanding of the present disclosure. However, it will be evident to one of ordinary skill in the art that the present disclosure may be practiced without these specific details or with equivalents thereof. In other instances, well known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "implementing," "inputting," "operating," "deciding," "detecting," "notifying," "aggregating," "coordinating," "applying," "comparing," "engaging," "predicting," "recording," "analyzing," "determining," "identifying," "classifying," "generating," "extracting," "receiving," "processing," "acquiring," "performing," "producing," "providing," "prioritizing," "arranging," "matching," "measuring," "storing," "signaling," "proposing," "altering," "creating," "computing," "loading," "inferring," or the like, refer to actions and processes of a computing system or similar electronic computing device or processor. The computing system or similar electronic computing device manipulates and transforms data represented as physical (electronic) quantities within the computing system memories, registers or other such information storage, transmission or display devices.

Various embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

An automated vehicle parking system uses a vehicle driver's communication device, such as a smartphone or portable tag to identify the driver. The system uses one or more vehicle sensors to detect the vehicle and to communicate with a vehicle driver's authentication device. The vehicle sensors, also known as sensing terminals (STs), are battery-powered to make them easy to install and make the system more secure. A system goal is to support more than 3 years of battery operation on low cost mass market batteries with total cell capacity not more than 20,000 mAh and at least 50 visitor sessions per day. Bluetooth Low Energy (BLE) is a wireless personal area network technology designed and marketed by the Bluetooth Special Interest Group (Bluetooth SIG) aimed at novel applications in the healthcare, fitness, beacons, security, and home entertainment industries. Compared to Classic Bluetooth, Bluetooth Low Energy is intended to provide considerably reduced power consumption and cost while maintaining a similar communication range. Bluetooth 5 builds on the Bluetooth Low Energy standard but increases the range, speed, and broadcast messaging capacity. In this document, the term BLE refers to Bluetooth Low Energy, Bluetooth 5 or any further standards building on Bluetooth Low Energy core specification. The STs use BLE to communicate with the vehicle driver's authentication device. A further system goal is to provide secure communications that prevent computer hackers from interfering with correct system operation. Unauthorized devices should not be able to decipher the contents of the system's communication messages and should not be able to interfere by duplicating the system's communication messages. The system using encrypted messages using encryption keys unique to each device. A replay attack is when an attacker replays an earlier message sent by an authorized user. The system includes dynamically varying data in the communication messages making it possible to detect replay attack messages.

The system offers a vehicle driver an efficient parking experience. When a driver drives a vehicle into a parking space e.g., a space, a stall, a marked bay, or an unmarked parking area, the system typically sends a message to the driver's authentication device indicating if the driver can park in the current space. The message may include additional information such parking fees or regulations. The driver's authentication device has to be pre-registered with the system. In the case of a smartphone, the driver must have downloaded the appropriate parking app and filled in a profile. In one embodiment the driver manually opens the parking app before the driver has parked and securely starts a parking session. In an alternate embodiment, the driver may see a system notification message that offers the option of starting the parking app and/or parking session. When the driver drives the vehicle out of the parking space, the system automatically terminates the parking session and sends a message to the driver's authentication device.

Figure 1:
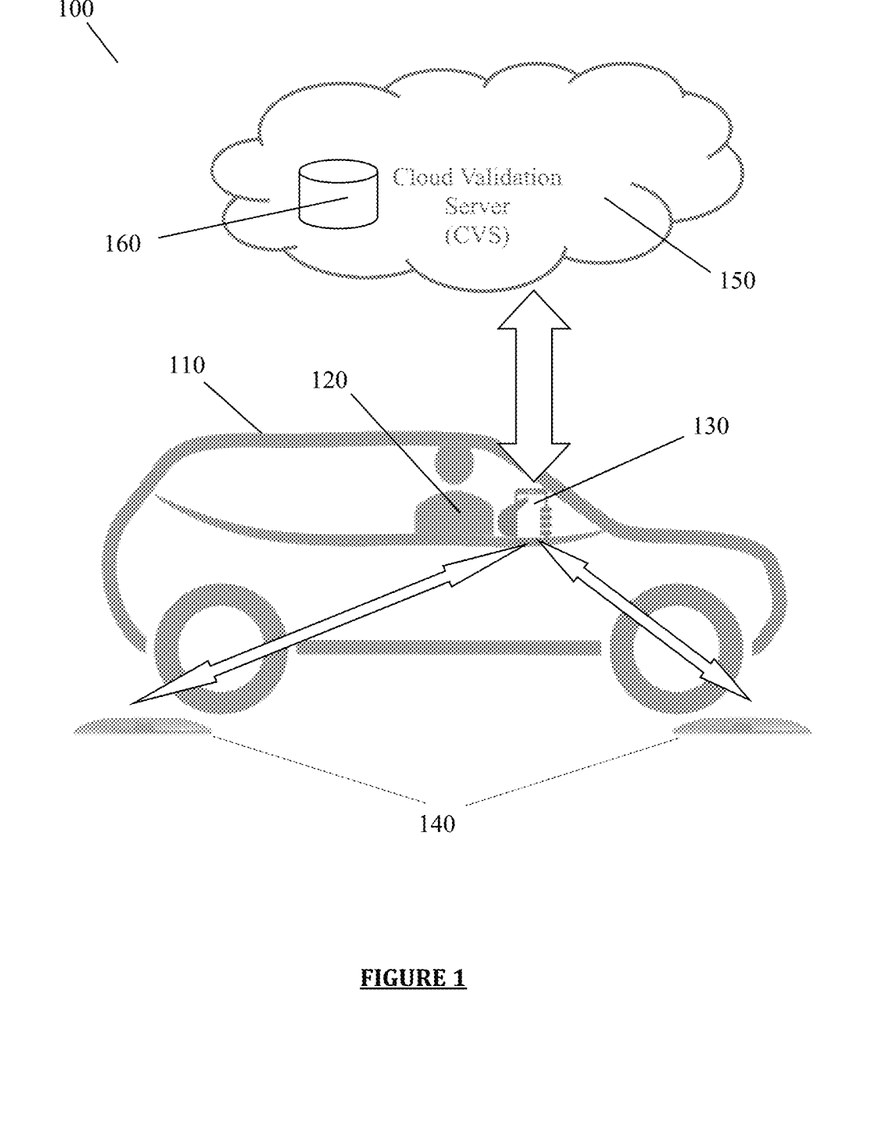
FIG. 1 is an exemplary diagram showing a system for detecting and identifying parked vehicles using a connected visitor appliance (CVA) according to embodiments of the present invention.

FIG. 1 is an exemplary diagram 100 showing a first embodiment of the system for detecting and identifying parked vehicles. The vehicle 110 contains a driver 120 holding a smartphone 130. STs 140 detect vehicle 110 and communicate with the smartphone 130. The smartphone 130 is an example of a Connected Visitor Appliance (CVA). The CVA, also known as a mobile computing device, can be any computing-capable appliance supporting a BLE interface and Internet access, e.g. a smartphone, a laptop computer, a tablet, or a vehicle's embedded computer. The smartphone 130 communicates with a Cloud Validation Server (CVS) 150. The CVS 150 is a remote computing system, remote validation server, or other remote server that maintains a CVS database 160 which it uses to validate the identities of the CVAs and associated STs. The CVS 150 can also keep track of parking events, such as the length of time that a vehicle has parked. The CVS 150 supports an application programming interface that defines message commands and message formats. The CVS database 160 contains ST information which can include ST device identifier, ST encryption key (STEK), ST location, ST parking restrictions, and ST parking rates. The CVS database 160 contains customer information which can include customer name, customer authorizations, associated CVA device identifiers, vehicle registration number(s) and automated payment details.

FIG. 1 shows two STs 140 detecting vehicle 110 and communicating with smartphone 130. The number of STs that detect a specific vehicle depends on the parking situation. In a car park with marked bays there may be one ST located near the middle of the marked bay. In this situation, only one ST may detect the vehicle and that ST will be associated with a specific parking bay. Street parking is one scenario in which there may be no marked bays. With unmarked parking bays, the STs are typically placed closer together and multiple STs will normally detect the same vehicle.

Using only one type of ST makes system installation and maintenance easier. Using multiple different types of STs can lead to improved detection capability. For example, some locations have electromagnetic anomalies that interfere with magnetic vehicle sensors and other types of vehicle sensors can be sensitive to the size, shape and composition of the vehicle. Some STs incorporate more than one type of sensor to improve their accuracy. Combining the results from different types of sensors and from different ST types gives improved detection efficiency.

Figure 2:
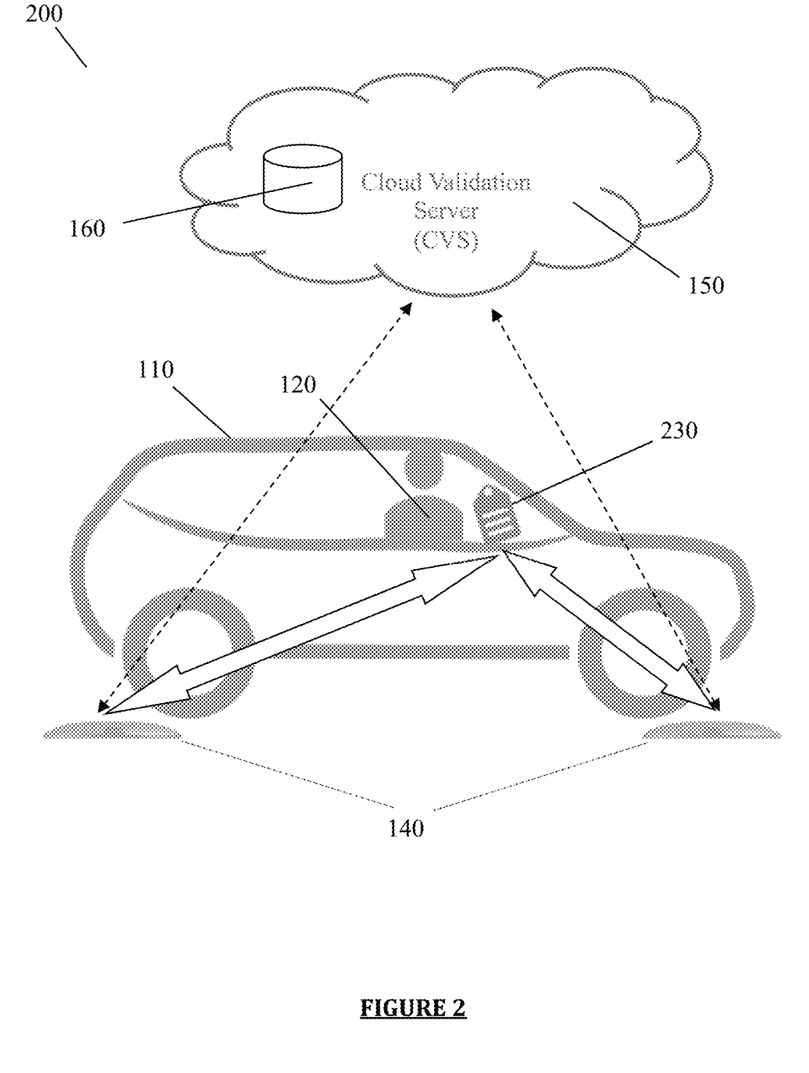
FIG. 2 is an exemplary diagram showing a system for detecting and identifying parked vehicles using a visitor tag (VTag), or "fob," according to embodiments of the present invention.

FIG. 2 is an exemplary diagram 200 showing a second embodiment of the system for detecting and identifying parked vehicles. The vehicle 110 contains a driver 120 holding a Visitor Tag (VTag) 230. STs 140 detect vehicle 110 and communicate with the VTag 230 using BLE. The VTag 230 is a BLE-enabled device such as a key fob using a coin cell battery. The VTag 230 does not have internet capability so the system requires the STs 140 to perform all communication with CVS 150. The STs 140 have long-range wireless communication capability. The CVS database 160 contains customer information which includes associated VTag device identifiers and encryption keys (VTagEKs). The system of FIG. 2 is useful when a driver does not want to use a CVA such as a smartphone. The VTags are portable and inexpensive. Using a smartphone has the advantage of a faster internet communication with CVS, a screen for showing messages and helps reduce ST battery use.

Figure 3:
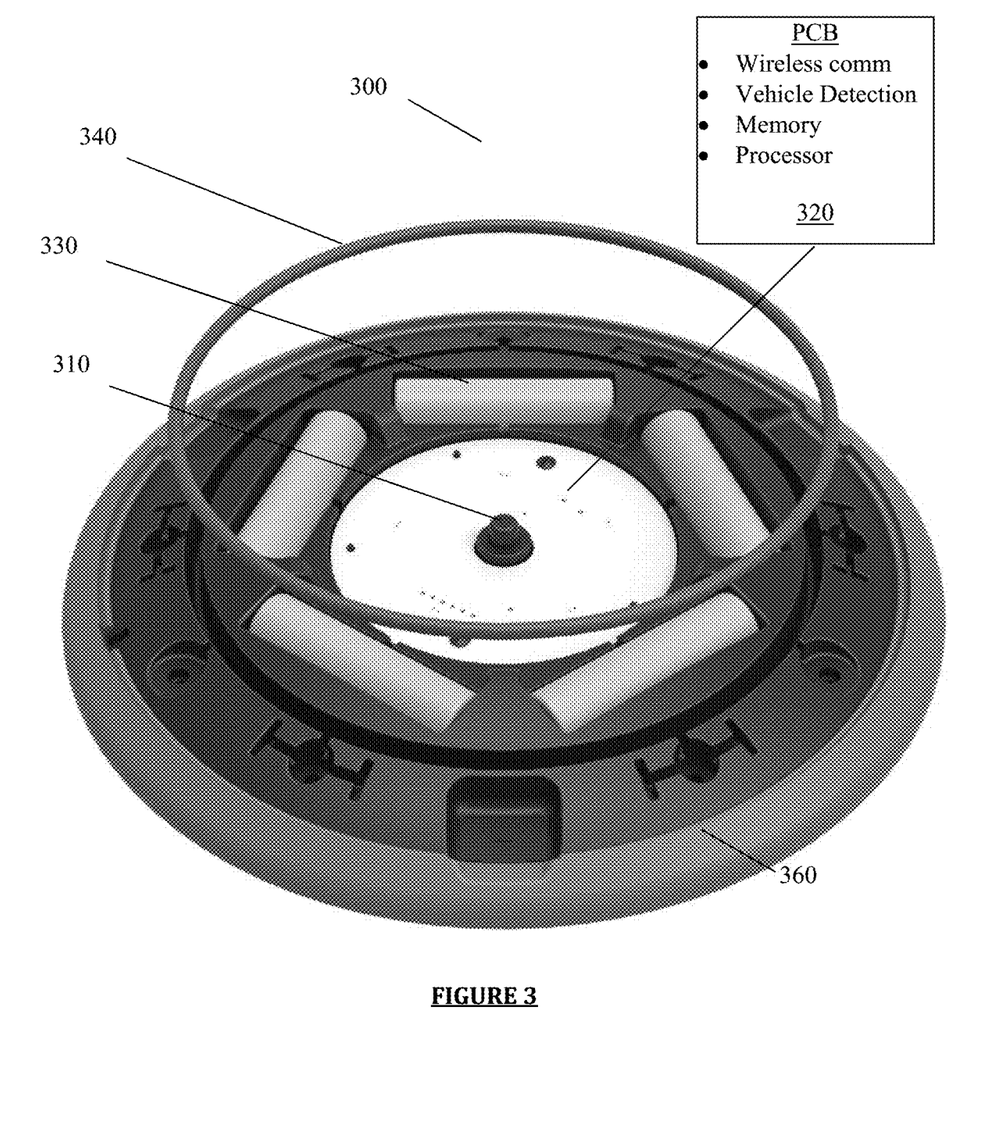
FIG. 3 is an exemplary diagram showing one type of vehicle sensor device or terminal (ST) with the top cover removed according to embodiments of the present invention.

FIG. 3 is an exemplary diagram 300 showing one type of vehicle sensor (ST). ST 300 is an example of a surface-mounted parking sensor. ST 300 is typically glued to a parking surface. A lid (not shown) fits on top of ST 300. A central pillar 310 connects to the lid and can support much of a vehicle's weight. A circular printed circuit board (PCB) 320 houses the electronics which can include wireless communications capabilities, vehicle detection capabilities, and computing capability in the form a processor with memory. The wireless communication capabilities include BLE and long-range wireless. The long-range wireless capability allows the ST to communicate with the CVS directly or via a base-station (not shown). The vehicle detection capabilities can include a magnetometer to detect ferrous metals, an IR sensor to detect reflected LED pulses, an active ultrasonic sensor based on time-of-flight principle, vibration and other sensors. The batteries 330 provide power to the PCB 320. A rubber O-ring 340 keeps the electronic components dry and helps support the weight of a vehicle.

Other ST types can be embedded in the parking surface, attached to or suspended from a ceiling, or attached to walls. An ST can also be an image-processing system using a camera.

Figure 4A:
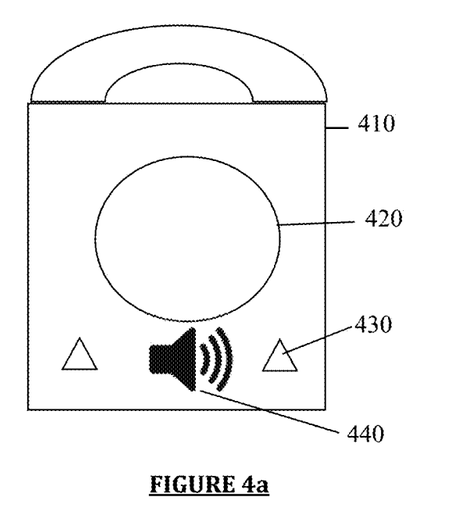
FIG. 4a is an exemplary diagram showing the top view of a VTag device, or fob, according to embodiments of the present invention.

FIG. 4a is an exemplary diagram showing the top view of an embodiment of a visitor tag (VTag). The VTag casing 410 is typically made of molded plastic. The VTag has a button 420, one or more LEDs 430 and a sound speaker 440. The driver can communicate with the system by pressing the button 420. The system communicates with the driver by sending sounds to the speaker 440 and by lighting or flashing the LEDs 430.

Figure 4B:
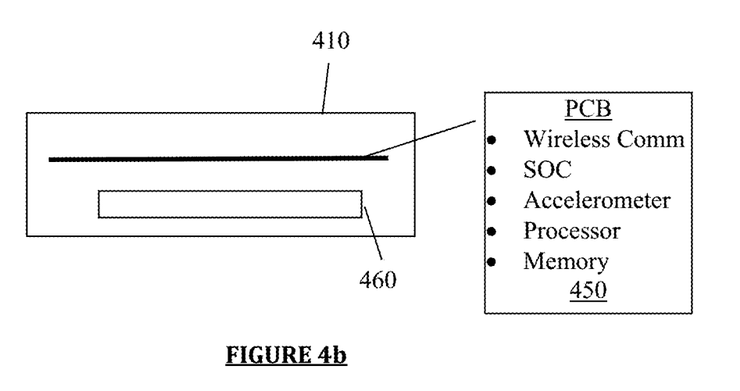
FIG. 4b is an exemplary diagram showing the side view of a VTag device, or fob, according to embodiments of the present invention.

FIG. 4b is an exemplary diagram showing the side view of an embodiment of a visitor tag (VTag). The VTag contains a PCB with the electronics for BLE communication, an optional accelerometer and computing capability in the form a processor with memory. Commercial system-on-a-chip (SOC) packages are available to provide BLE communication and computing capability. The accelerometer can be used to detect when a vehicle has stopped moving. The VTag can conserve power by only receiving BLE messages when a vehicle has recently stopped moving.

Figure 5:
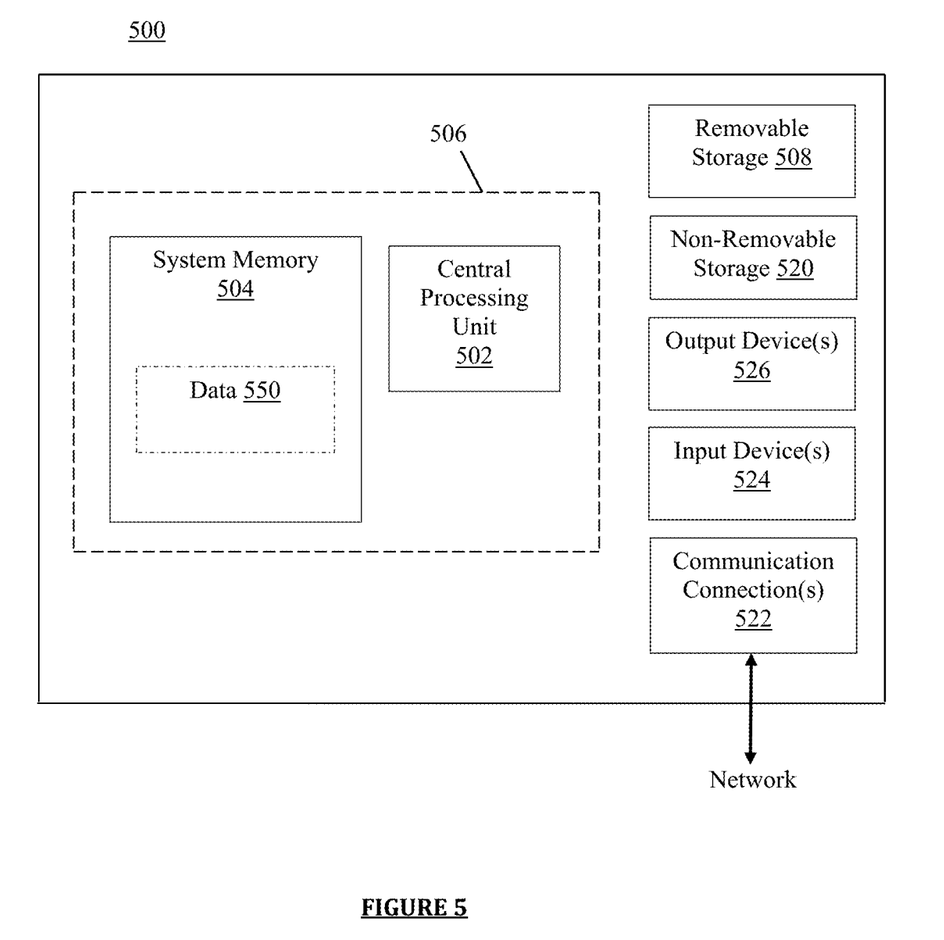
FIG. 5 is a block diagram of an example of a computing system upon which one or more various embodiments described herein may be implemented in accordance with various embodiments of the present disclosure.

FIG. 5 is a block diagram of an example of a computing system 500 upon which one or more various embodiments described herein may be implemented in accordance with various embodiments of the present disclosure. In a basic configuration, the system 500 includes at least one processing unit 502 and memory 504. This basic configuration is illustrated in FIG. 5 by dashed line 506. The system 500 may also have additional features and/or functionality. For example, the system 500 may also include additional storage (e.g., removable and/or non-removable) including, but not limited to, magnetic or optical disks or tape. Such additional storage is illustrated in FIG. 5 by removable storage 508 and non-removable storage 520.

The system 500 may also contain communications connection(s) 522 that allow the device to communicate with other devices, e.g., in a networked environment using logical connections to one or more remote computers. Furthermore, the system 500 may also include input device(s) 524 such as, but not limited to, a voice input device, touch input device, keyboard, mouse, pen, touch input display device, etc. In addition, the system 500 may also include output device(s) 526 such as, but not limited to, a display device, speakers, printer, etc.

In the example of FIG. 5, the memory 504 includes computer-readable instructions, data structures, program modules, and the like associated with one or more various embodiments 550 in accordance with the present disclosure. However, the embodiment(s) 552 may instead reside in any one of the computer storage media used by the system 500 or may be distributed over some combination of the computer storage media or may be distributed over some combination of networked computers but is not limited to such.

It is noted that the computing system 500 may not include all of the elements illustrated by FIG. 5. Moreover, the computing system 500 can be implemented to include one or more elements not illustrated by FIG. 5. It is pointed out that the computing system 500 can be utilized or implemented in any manner similar to that described and/or shown by the present disclosure but is not limited to such.

In the case of the CVA, the embodiment 550 is the downloaded parking app. In the case of the ST, the ST device identifier (ID) and STEK are stored in non-removable storage 520. In the case of the VTag, the VTag device identifier and VTagEK are stored in non-removable storage 520. In some embodiments the ST device identifier, STEK, VTag device identifier and VTagEK are stored in one-time programmable (OTP) memories. The ST device identifier, STEK, VTag device identifier and VTagEK can be assigned values either during manufacturing or during installation.

Figure 6:
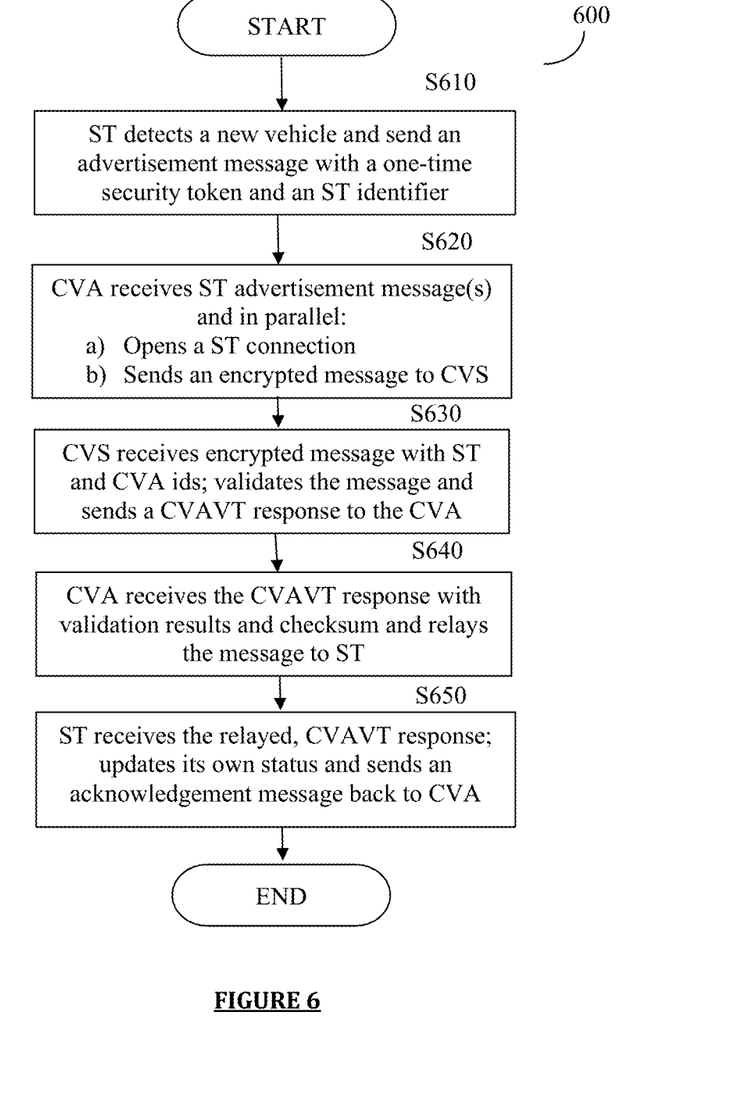
FIG. 6 is a flow diagram that illustrates an exemplary method of securely detecting and identifying a vehicle for parking in accordance with embodiments of the present invention where the CVA communicates with the remote server and the ST engages in bi-directional communication.

FIG. 6 is a flow diagram 600 that illustrates a first exemplary method of securely detecting and identifying a parked vehicle in accordance with various embodiments of the present disclosure. In step S610 an ST uses one or more of its physical sensors to detect that a new vehicle has parked close to the ST. The ST starts to advertise its "occupied and available for check-in" status over the BLE interface. The advertisement packet includes a one-time security token (OTST) generated for every new event and/or time interval preventing replay attacks. The ST creates the OTST by encrypting a combination of known, fixed and dynamic data with the ST's own encryption key (STEK). In one example, the OTST consists of a concatenated string with: ST Device ID, an incrementing Session ID, a useful payload, the system time, an event-time indicating the time of the last occupancy-status change, the ST occupancy-status and a random number. The useful payload may include data, such as vehicle sensor measurements, that could help the CVA select which ST is the most suitable for check-in.

In one embodiment the ST appends a plain text ST device identifier to the OTST. In a second embodiment the ST appends an encrypted ST device identifier that can be decrypted by CVS, to the OTST. This encrypted ST device identifier may be encrypted and later decrypted with a common key known to both the ST and the CVS. Later on, the CVS may determine the ST identity by a) analyzing the outer layers of the OTST networking packet to determine the ST's IP address or mac address; or b) using the information appended to the OTST. The system may use any of the popular block encryption ciphers including 3DES, AES, SPECK, etc. Although such symmetric encryption is more suitable for implementation on battery powered ST devices (because of the shorter keys and ease of computation) the invention is not limited to particular encryption algorithm types.

In the embodiment of FIG. 6, each ST has possible occupancy-status values of "unoccupied", "occupied and available for check-in", or "occupied with visitor validated" which can be constantly advertised with varying frequency to optimize battery life. The ST changes its occupancy-status to "occupied and available for check-in" when it detects a vehicle. When a parked vehicle has been validated, the ST changes its occupancy-status to "occupied with visitor validated". After the parked vehicle leaves, the ST changes its occupancy-status to "unoccupied". The ST repeatedly sends advertisement messages, typically multiple times per second, regardless of the occupancy-status. Sending frequent advertisement messages makes it likely that some messages will be received by the CVA during a DOS attack. The ST sends the same OTST until one of data fields (e.g., the occupancy-status, the system time, a sensor reading) has changed or a pre-defined time has expired. The ST computes an OTST checksum for later validating a CVS response. The ST keeps track of the most recent OTST checksums.

When the ST can no longer detect a vehicle, it changes its own status to "unoccupied" and sends a message to CVS using the long-range wireless communication capability.

In step S620 the CVA receives one or more ST advertisement packets. In this embodiment, if the CVA receives advertisement packets from more than one ST within a predefined time interval, the CVA selects the best ST. The best ST is usually the closest ST. The CVA may wait to detect multiple advertisement packets before it proceeds with sending data to CVS. In one embodiment, the CVA initiates two processes in parallel:

a. Opening a connection to the selected ST device over BLE. Establishing a BLE connection on CVA can take two seconds so it should be started in parallel with CVS communication.

b. Forwarding the OTST from the selected ST to CVS over an internet connection.

In this embodiment the CVA appends information, such as a CVA device identifier, to the OTST. The CVS may determine the CVA identity by a) analyzing the outer layers of the OTST networking packet to check the CVA's security token or user credentials; or b) using information appended to the OTST.

In step S630 the CVS receives the OTST and determines the ST device identifier and the CVA device identifier. The CVS looks in the CVS database to find the STEK associated with the ST device identifier. If the CVS cannot find the ST device identifier the validation has failed. The CVS decrypts the OTST using the STEK and checks the validity of the output string. For example, the ST device identifier must match the decrypted ST device identifier, the system time and event related times should be consistent, and any decrypted Session ID must be in the right range. After validating the message, the CVS sends an acknowledgment message to the CVA. The acknowledgment message includes (i) the validation result; and in the case of a positive validation result (ii) a CVA validation token (CVAVT). The CVAVT is a combination of data known only to ST and CVS, containing fixed and dynamic data encrypted with STEK. For example, the CVAVT can be the concatenation of the checksum of the decrypted OTST, the CVA device identifier, and a random number. The CVS can perform other validation steps such as checking the identity of the CVA owner by looking for the CVA device identifier in the CVS database.

In step S640 the CVA receives the CVAVT from CVS over the internet. If the CVA receives a positive validation the CVA forwards the CVAVT to the ST over the BLE connection. In step S650 the ST receives the CVAVT from CVA over BLE. The ST verifies that CVAVT data is correct and updates its own status to "occupied with visitor validated". The ST sends an acknowledgement message, indicating if the CVAVT is valid, to the CVA over BLE. The CVA may forward the acknowledgement message to the CVS so the CVS can keep track of the parking status. The CVAVT may contain additional information, such as parking details, which the ST decrypts and forwards to the CVA as part of the acknowledge message.

Figure 7:
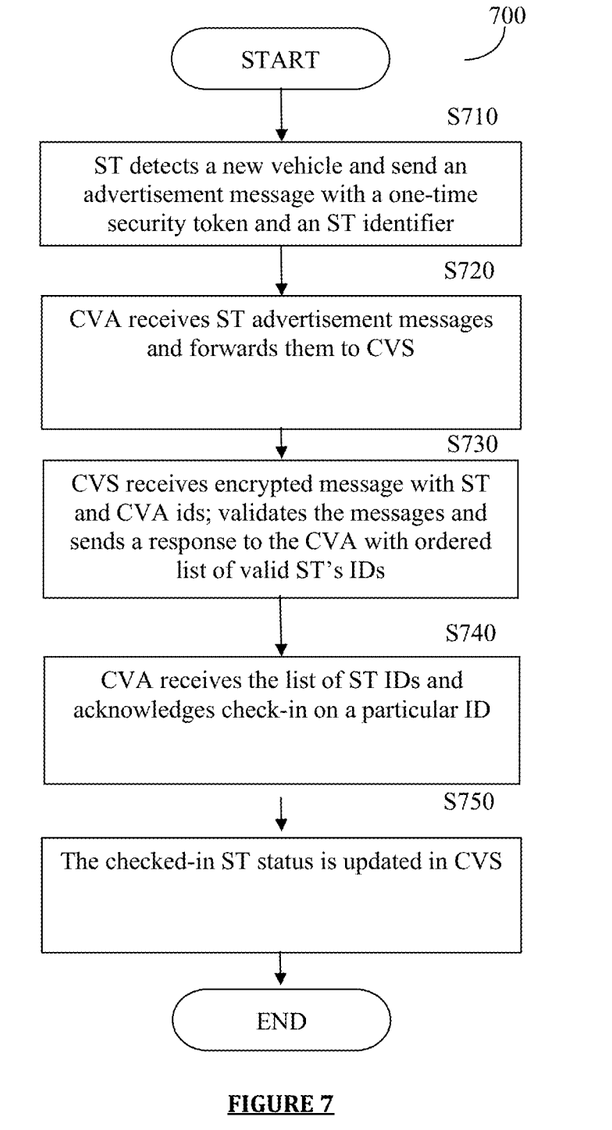
FIG. 7 is a flow diagram that illustrates a second exemplary method of securely detecting and identifying a vehicle for parking in accordance with embodiments of the present invention where the CVA communicates with the server and the ST does not engage in bi-directional communication.

Using the CVA to relay messages between the ST and the CVS has several advantages. The CVA is a high-volume, consumer-oriented device offering fast internet speeds compared to the ST's long-range wireless capability. The ST uses less battery power when it restricts itself to BLE communications. The method of FIG. 6 is well-suited to parking environments where there is there is one ST for each parking space, stall, bay, or area, and simultaneous parking events within a single CVA's BLE range are rare. The method of FIG. 7 is better-suited to parking environments where there is a) unmarked parking and vehicles may park on or between multiple STs at the same time b) parking spaces are located on both sides of the street and/or c) faster and more robust validation is required in an environment with weaker BLE signals, higher 2.4 GHz interference or ongoing DOS attacks. In the method of FIG. 7 each ST has possible occupancy-status values of either "unoccupied", or "occupied". The ST changes its occupancy-status to "occupied" when it detects a vehicle and "unoccupied" when it cannot detect a vehicle. In the method of FIG. 7, the validation result is not sent to the ST so there is no need for an ST to accept a BLE peer-to-peer, network connection. This helps mitigate the risk of a denial-of-service (DOS) attack where an attacking device calls for a ST connection and then stalls after a peer-to-peer connection is established.

FIG. 7 is a flow diagram 700 that illustrates a second exemplary method of securely detecting and identifying a parked vehicle on a particular ST in accordance with various embodiments of the present disclosure. In step S710 an ST uses one or more of its physical sensors to detect that a new vehicle has parked close to the ST. The ST advertises its status over the BLE interface. The advertisement packet includes a one-time security token (OTST) generated for every new event and/or time interval as described earlier.

In step S720 the CVA receives multiple ST advertisement packets from the STs that are within range. After waiting for a predefined period of time, the CVA forwards the advertisement packets to the CVS. The CVA appends data to the advertisement packet, such as BLE signal strength, that can help determine the proximity of the ST from the CVA.

In step S730 the CVS receives the multiple ST advertisement packets from the CVA. The CVS determines the ST device identifier associated with each ST advertisement packet as described earlier. The CVS looks in the CVS database to find the STEK associated with each ST device identifier. The CVS decrypts the ST advertisement packets with known STEKs and validates them as described earlier. The CVS may further check that the STs are at the same location. The CVS can determine the expected ST locations from the CVS database. The ST locations may be inconsistent if someone has physically moved the ST or if an attacker replays an ST message from a different location. The CVS orders the valid STs in terms of their suitability for check-in. The CVS may consider the closest, unoccupied, valid ST as most suitable if no occupied STs are appropriate for check-in. The CVS may send a message to the CVA requesting more information if it has difficulty in ordering the valid STs. After ordering the STs, the CVS sends a message to CVA where the message contains an ordered list of valid ST IDs or a single ST ID for check-in.

When multiple vehicles park at approximately the same time, the CVS will receive multiple ST messages from multiple CVAs. The CVS maintains a parking event database that lists when and where each visitor parked. The CVS updates its parking event database using ST occupancy-status, ST sensor measurements, BLE signal strengths, ST event times and other data from the ST advertisement packets it received from the CVA. The system may be able to detect a vehicle's position when a CVA receives advertising packets from multiple ST nodes even when the STs' physical sensors are unable to definitively detect the vehicle.

In step S740 the CVA receives the ST ID(s) from CVS over the internet and acknowledges check-in on particular ST. The list of ST IDs may, for example, be used to ask a CVA user to select between alternative parking spaces associated with different STs. If a list of ST IDs is sent to the CVA, the CVA sends a message that identifies the selected ST back to the CVS.

Figure 8:
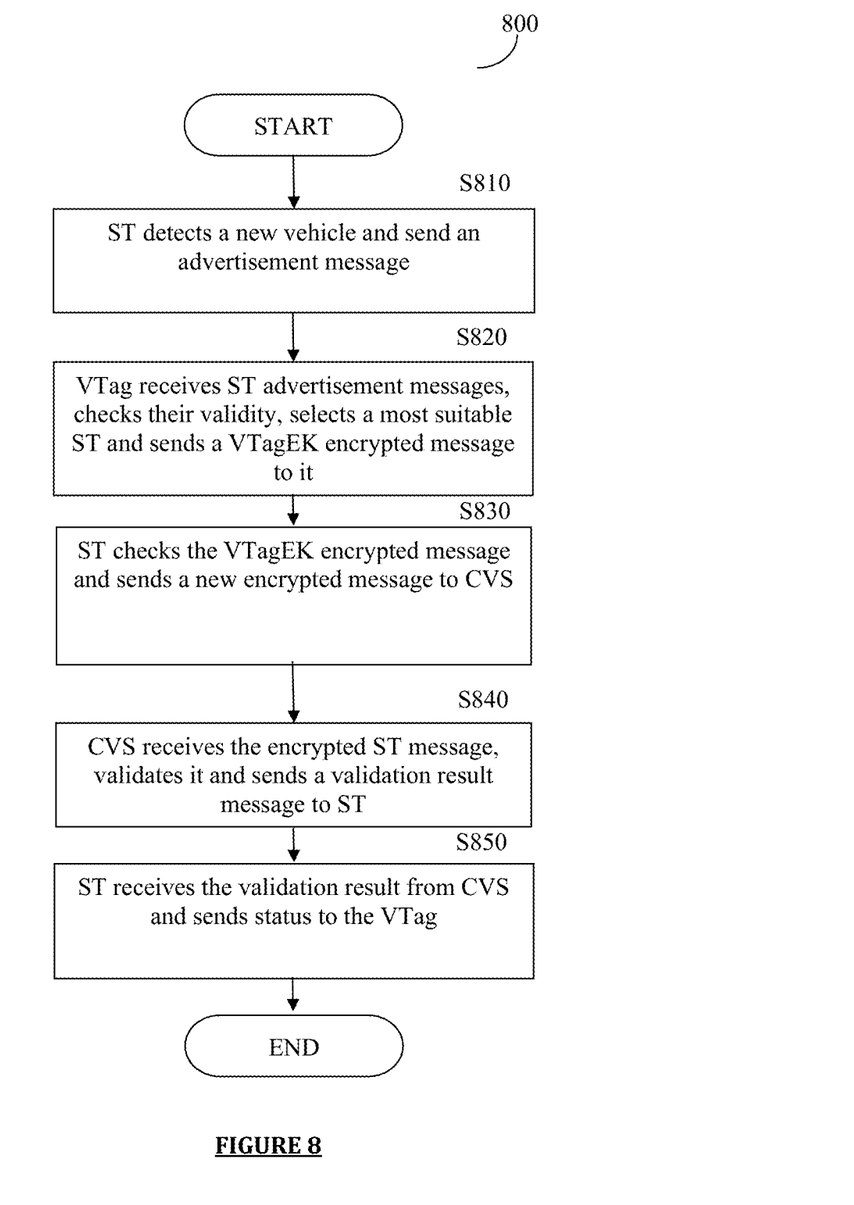
FIG. 8 is a flow diagram that illustrates a third exemplary method of securely detecting and identifying a vehicle for parking in accordance with embodiments of the present invention where a VTag device is used to provide driver identification.

FIG. 8 is a flow diagram 800 that illustrates a third exemplary method of securely detecting and identifying a parked vehicle in accordance with various embodiments of the present disclosure. This method applies to situations in which a driver has a VTag. This method assumes that STs within a parking area share an area encryption key (AEK). A VTag contains of list of AEKs corresponding to the parking areas for which it has access.

In step S810 an ST uses one or more of its physical sensors to detect that a new vehicle has parked close to the ST. The ST starts to advertise its status over the BLE interface. The advertisement packet includes a one-time security token (OTST) generated for every new event as described earlier. The ST encrypts the OTST with its AEK. To support a mix of vehicles where some have a CVA and others have a VTag, the ST may a) send both AEK-encrypted advertisement packets and STEK encrypted advertisement packets or b) send an extended advertising message containing both types of encrypted blocks.

In step S820 the VTag receives multiple ST advertisement packets from the STs that are within range. The VTag decrypts the ST advertisement packets with AEKs from its list of AEKs. The VTag validates the decrypted advertisement packets until it finds the most suitable ST with valid advertisement packets. The VTag creates a One-Time Visitor Token (OTVT) by encrypting a combination of known, random and/or dynamic payload data with its individual VTagEK and passes this OTVT to the ST. The VTag proves its identity to the ST by adding AEK encrypted data known by the ST, e.g. the checksum of the decrypted OTST plus a nonce.

In step S830 the ST receives the OTVT from the VTag over BLE. The ST checks the VTag identity by decrypting the AEK-encrypted data and comparing the checksum of the decrypted OTST against a checksum of the original OTST it sent. The ST forwards the OTVT to CVS over the long-range wireless.

In step S840 the CVS receives the OTVT from the ST. The CVS detects the VTag identifier and uses it to find the associated VTagEK within the CVS database. The CVS decrypts the OTVT using the VTagEK and validates the decrypted data as described before. In step S850 ST receives the validation result from CVS and sends the validation status to the VTag.

All examples and conditional language recited herein are intended for pedagogical purposes to aid the reader in understanding the principles of the present disclosure and the concepts contributed by the inventor to furthering the art and are to be construed as being without limitation to such specifically recited examples and conditions. Moreover, all statements herein reciting principles, aspects, and embodiments of the present disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

The foregoing descriptions of various specific embodiments in accordance with the present disclosure have been presented for purposes of illustration and description. They are not intended to be exhaustive or to limit the present disclosure to the precise forms disclosed, and many modifications and variations are possible in light of the above teaching. The present disclosure is to be construed according to the Claims and their equivalents.

What is claimed is:

1. A method of automatically detecting and validating a vehicle, the method comprising:
   detecting a vehicle using a plurality of sensing devices in proximity to the vehicle;
   broadcasting a plurality of first messages from the plurality of sensing devices responsive to the detecting wherein the broadcasting is performed by wireless communication and wherein the first message or part of that first message is encrypted and the first messages comprise sensing device identifiers and are received by a mobile computing device associated with the vehicle;
   sending a second message from the mobile computing device to a remote validation server responsive to receiving the first message, wherein the second message comprises an identifier of the mobile computing device and all or part of the first message, and wherein the second message comprises the plurality of first messages;
   validating the second message at the remote validation server based on the identifier of the mobile computing device and a database of the remote validation server, wherein the validating comprises validating the plurality of sensing devices using the plurality of sensing device identifiers and the database;
   sending a third message from the remote validation server to the mobile computing device indicating a result of the validating, wherein the third message comprises a listing of validated sensing devices determined from said validating;
   selecting a sensing device from the listing of validated sensing devices, wherein the selecting is performed by one of: a user input using additional data, including at least one of:
      wireless signal strengths of the plurality of first messages;
      times of vehicle detection on each sensing device;
      the status of each sensing device; and
      sensor measurements on each sensing device; and
   sending or acknowledging an identification of the selected sensing device from the mobile computing device to the remote validation server.

2. The method as described in claim 1, further comprising:
   sending a fourth message indicating the result of the validating from the mobile computing device to the selected sensing device, wherein the second message comprises a vehicle occupancy status associated with the selected sensing device; and
   updating a status of the selected sensing device responsive to the sensing device receiving the message indicating the result of the validating, wherein the status of the sensing device is updated to indicate that a parking space associated with the sensing device is occupied by a validated visitor.

3. The method as described in claim 1, wherein the validating the second message comprises:
   decrypting an encrypted part of the first message included in the second message to determine an originating sensing device identifier;

determining a mobile computing device identifier from the second message; and authenticating the sensing device identifier against the mobile computing device identifier using information in the database.

4. The method as described in claim 1, wherein the database comprises individual and/or group encryption keys for the sensing device.

5. The method as described in claim 1, wherein the broadcasting a first message is performed using Bluetooth Low Energy (BLE), Bluetooth 5 or successor protocols.

6. The method as described in claim 1, wherein one or more of the first messages comprises a time varying data field.

7. The method as described in claim 1, wherein one or more of the messages comprise respective checksum data.

8. The method as described in claim 1, wherein the broadcasting comprises transmitting first messages multiple times per 10 second interval regardless of the occupancy status of the sensing device and wherein each first message comprises a respective time varying data field.

9. The method as described in claim 1, wherein:

the selected sensing device detects when a vehicle has left a parking space and sends a message responsive to the detecting and wherein the message is sent by wireless communication, and wherein the message or part of the message is encrypted and wherein further the message comprises a sensing device identifier and is received by the remote server.

10. A system for validating a vehicle for parking, said system comprising:

a plurality of sensing devices each comprising a respective sensing device identifier and operable to detect a vehicle in close proximity thereto and the plurality of sensing devices further operable to wirelessly communicate a plurality of a first encrypted messages comprising the respective sensing device identifier responsive to detecting the vehicle;

an application program operable to execute on a mobile electronic device comprising an identifier wherein the mobile electronic device is a smart phone or vehicle's embedded computer, wherein the application program is operable to receive said plurality of first encrypted messages and to generate a second message comprising: said identifier of the mobile electronic device; and all or part of the plurality of first encrypted messages, wherein the second message comprises said plurality of first encrypted messages; and a remote server comprising a database, said remote server operable to:

receive said second message;

validate said identifier of the mobile electronic device based on the sensing device identifiers and the second message;

communicate a third message indicating a validation result thereof;

record a parking state associated with the vehicle;

validate said plurality of sensing devices, wherein the third message further comprises a list of validated sensing devices of the plurality of sensing devices, wherein the application program on the smart phone or vehicle's embedded computer is further operable to select a selected sensing device from the list of validated sensing devices using one of: a user input using additional data, including at least one of: wireless signal strengths of the plurality of first encrypted messages; times of vehicle detection of the sensing devices; a status of the sensing devices; and sensor measurements of the sensing devices;

and wherein further the application program on the smart phone or vehicle's embedded computer is further operable to cause an identity of the selected sensing device to be communicated to the remote server.

11. The system as described in claim 10, wherein the database comprises an encryption key for the plurality of sensing devices and wherein the remote server is further operable to decrypt the second message using said encryption keys and wherein further the encrypted first message comprises a time varying data field.

12. The system as described in claim 10, wherein the plurality of first messages is sent to the application program on the smart phone or vehicle's embedded computer, wherein the application program is operable to cause to be sent the second message to the remote server, wherein the application program on the smart phone or vehicle's embedded computer is operable to receive the third message, and wherein the application program on the smart phone or vehicle's embedded computer is operable to cause to be sent an acknowledgement message to the sensing device indicating the validation result.

13. The system as described in claim 10, wherein the mobile electronic device comprises at least one of: a tablet computer, a smart watch, and an in-vehicle computing system.

14. The system as described in claim 10, wherein the sensing devices comprises a battery, and wherein the mobile electronic device is operable to communicate with the remote server to conserve power of the battery.

15. A method of automatically detecting and validating a vehicle, the method comprising:

detecting the vehicle using a plurality of sensing devices in proximity to the vehicle, wherein the plurality of sensing devices stores a shared area encryption key (AEK);

the plurality of sensing devices encrypting one-time security tokens (OTSTs) using the shared AEK;

the plurality of sensing devices transmitting the OTSTs to a visitor tag device (VTAG) associated with the vehicle;

the VTAG decrypting and validating the OTSTs using the shared AEK;

the VTAG selecting a selected sensing device from the plurality of sensing devices according to the decrypting and validating;

the VTAG generating a visitor token using an encryption key of the VTAG;

the VTAG transmitting the visitor token to the selected sensing device; and validating the visitor token.

16. The method of claim 15, further comprising the plurality of sensing devices transmitting extended advertising messages comprising OTSTs that are encrypted using shared AEK and OTSTs that are encrypted using a respective sensing device encryption key.

17. The method of claim 15, further comprising the VTAG storing the shared AEK in memory.

18. The method of claim 15, further comprising transmitting the visitor token for receipt by a cloud validation server, and wherein the validating the visitor token is performed by the cloud validation server.

19. The method of claim 18, wherein the visitor token comprises an identifier of the VTAG, and further comprising the cloud server validating the visitor token based on a VTAG encryption key associated with the identifier of the VTAG.

20. The method of claim 15, wherein the selecting a selected sensing device comprises determining a most suitable sensing device of the plurality of sensing devices.

21. The method of claim 15, wherein the selecting a selected sensing device comprises determining a closest unoccupied validated sensing device.

22. The method of claim 15, wherein the visitor token comprises a checksum of the OTST plus a nonce.

23. The method of claim 15, wherein the visitor token is operable to prove an identity of the VTAG to the sensing device.

24. The method as described in claim 15, wherein the visitor tag device utilizes a motion activated power savings mode.

\* \* \* \* \*